United States Patent [19]

Dalton

[11] 4,266,748
[45] May 12, 1981

[54] PORTABLE SWIVEL HUNTER'S STOOL

[76] Inventor: Thomas P. Dalton, 6010 Kew Park, Manitou Beach, Mich. 49253

[21] Appl. No.: 52,026

[22] Filed: Jun. 25, 1979

[51] Int. Cl.³ .............................................. A47C 3/18
[52] U.S. Cl. .................... 248/425; 108/139; 108/25; 297/4; 248/168
[58] Field of Search .......... 108/25, 150, 139; 211/163; 248/415, 435, 434, 168, 170, 425; 297/219, 4

[56] References Cited

U.S. PATENT DOCUMENTS

| | | | |
|---|---|---|---|
| 455,345 | 7/1891 | Lovejoy | 248/435 |
| 1,240,119 | 9/1917 | Burns | 248/168 X |
| 1,459,104 | 6/1923 | Johnson | 248/168 X |
| 2,785,735 | 3/1957 | Banks | 248/435 X |
| 2,905,229 | 9/1959 | Adams | 248/425 |
| 2,916,084 | 12/1959 | Bottemiller et al. | 248/425 |
| 3,409,265 | 11/1968 | Wicherg et al. | 248/415 |
| 3,503,523 | 3/1970 | Hamilton et al. | 248/425 X |
| 3,713,568 | 1/1973 | Sloan | 297/4 |
| 3,765,039 | 10/1973 | Ewoldt | 297/219 |
| 3,895,839 | 7/1975 | Amato | 297/4 |

Primary Examiner—Francis K. Zugel
Attorney, Agent, or Firm—Hugh Adam Kirk

[57] ABSTRACT

A horizontal completely and freely rotatable seat about a central vertical axis, which seat has a central cylindrical socket portion having a lower larger bearing and an upper smaller bearing for a correspondingly shaped hollow bell-shaped plug with depending leg means for supporting said seat for free rotation about the plug. The bearings may be of antifriction plastic and anchored to the socket in the seat. The seat may comprise a hollow torus or donut-shaped container with a correspondingly shaped cover removably held on said container by a pair of diametrically spaced slip-cords. The slip-cords also may be used for holding the removable plug and leg means and for attaching a shoulder strap and/or belt clip for carrying the seat in its knocked-down or collapsed condition. The plug and leg means may comprise collapsible tripod legs with removable, replaceable and/or telescopic feet to best fit the surface upon which they are to rest and support the seat. Cord means may be also provided for limiting the spread of the tripod legs which are pivoted at their upper ends inside the hollow plug around an axial tube which extends out the upper side of the plug and forms the smaller bearing surface for the smaller bearing in the socket of the seat and its cover. Also the tubular axis can act as a socket for a Y-shaped removable yoke for use as a gun rest or support for the front end of a snowmobile, or the like. Instead of tripod legs, a single leg or post may be attached to the axial tube in the bell-shaped plug, which single leg may have a pointed end and a spaced flange for sticking and limiting its insertion into soft ground, or the single leg may be attached to the inside of the bell and have a horizontal plate at its lower free end for mounting onto a board or a platform on a tree, or the leg may be short with spikes for engaging a log.

38 Claims, 12 Drawing Figures

U.S. Patent  May 12, 1981  Sheet 1 of 4  4,266,748
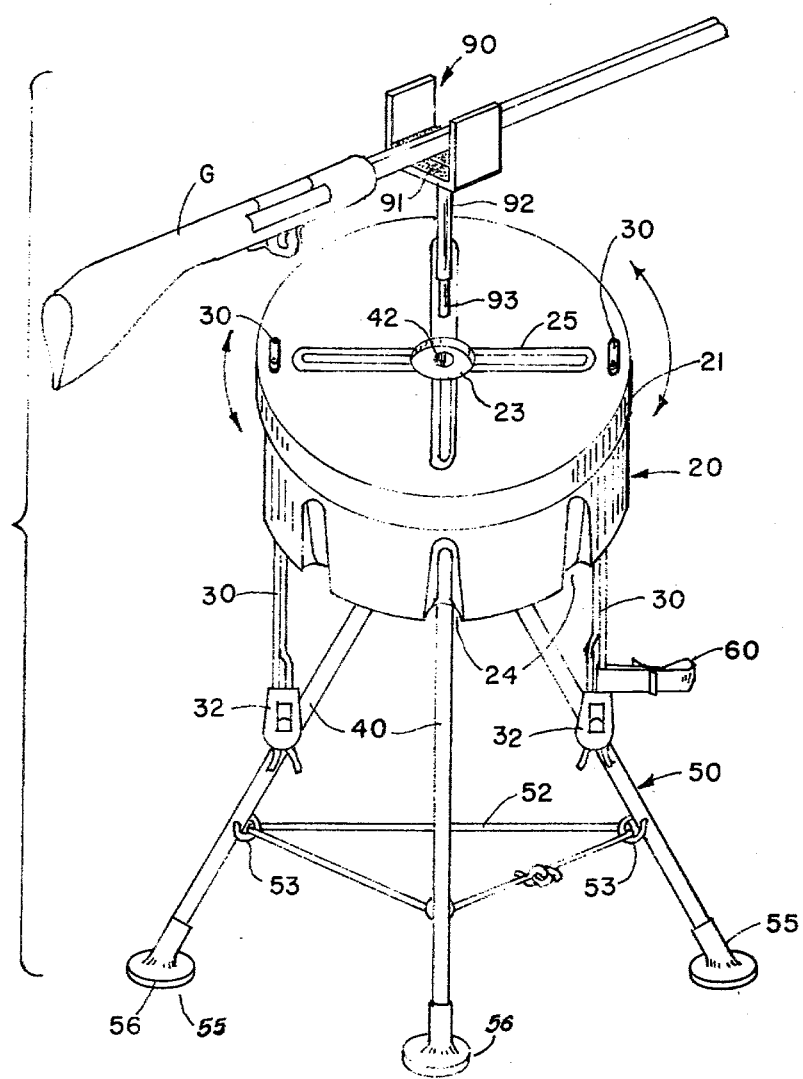
FIG. I
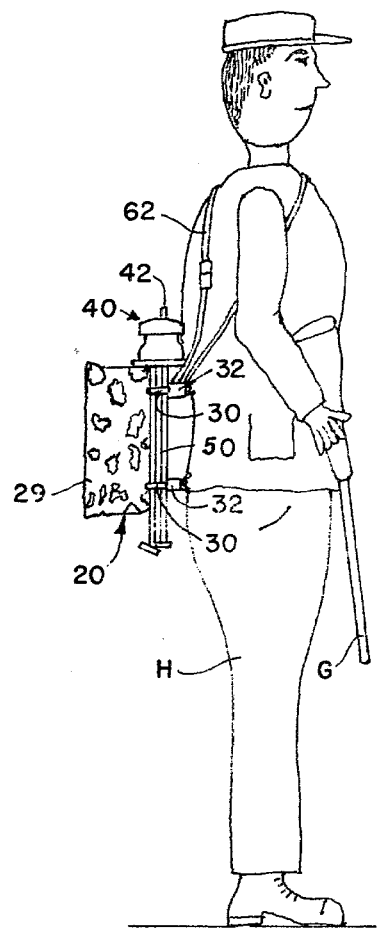
FIG. II

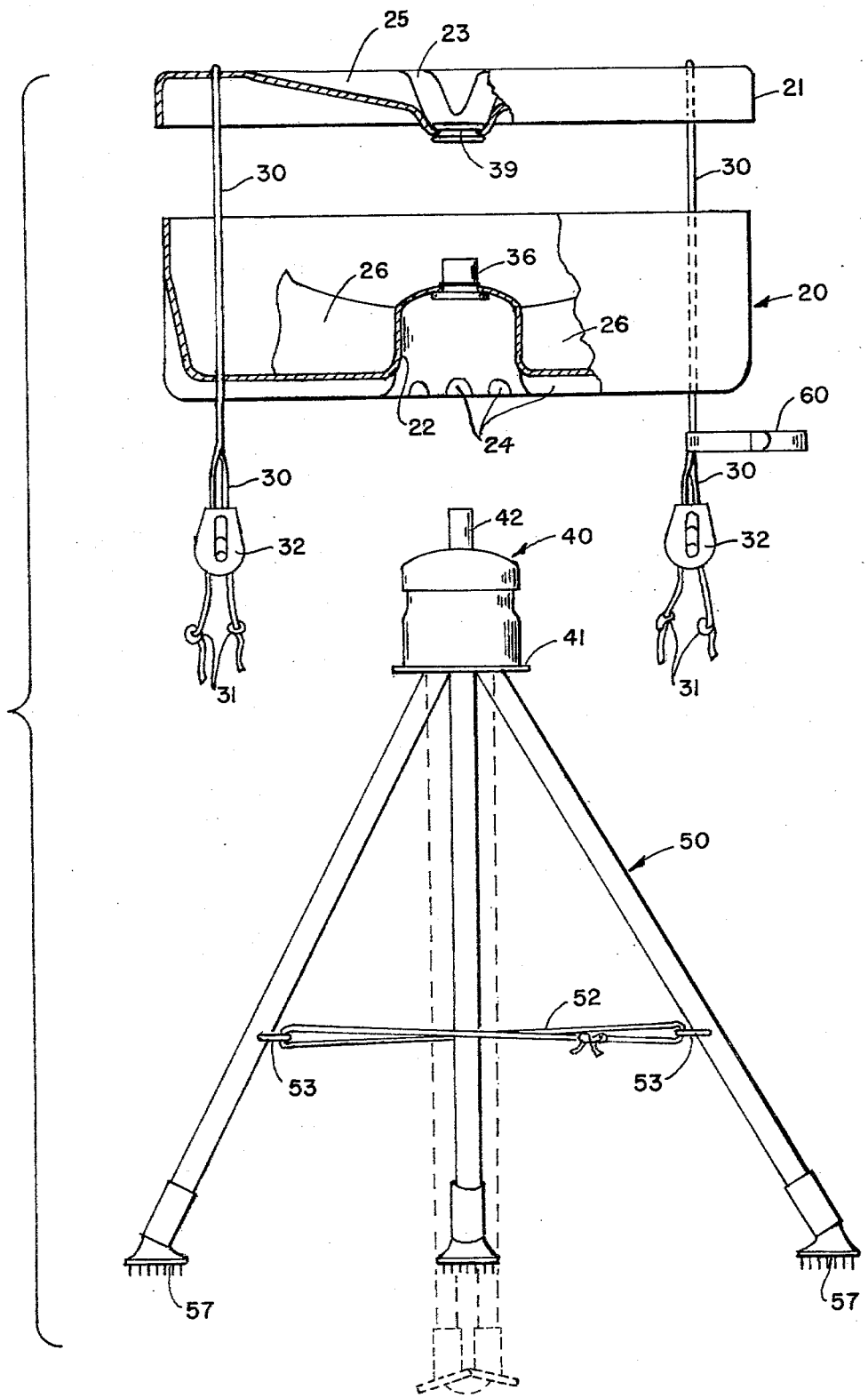
FIG. III

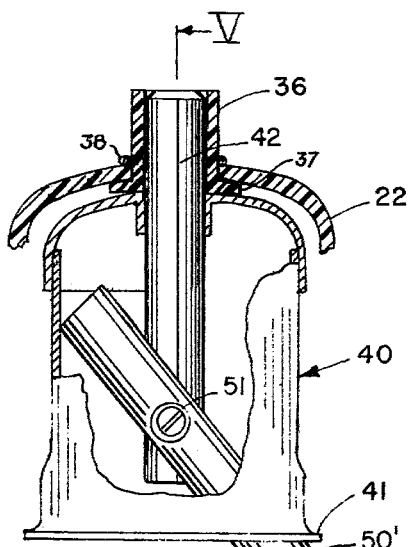
FIG. IV
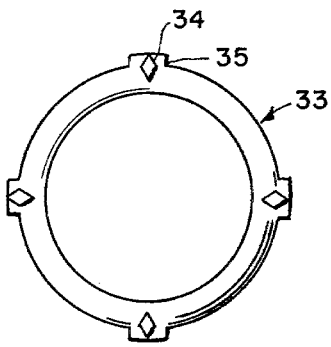
FIG. VI
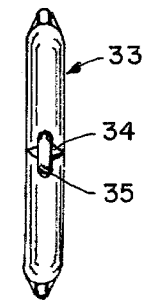
FIG. VII
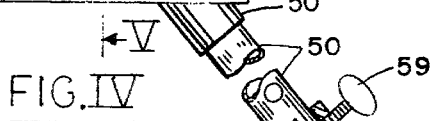
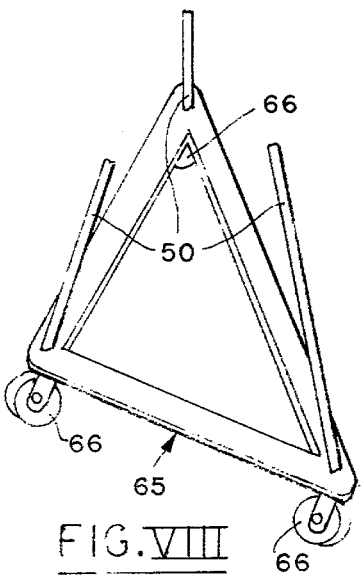
FIG. VIII
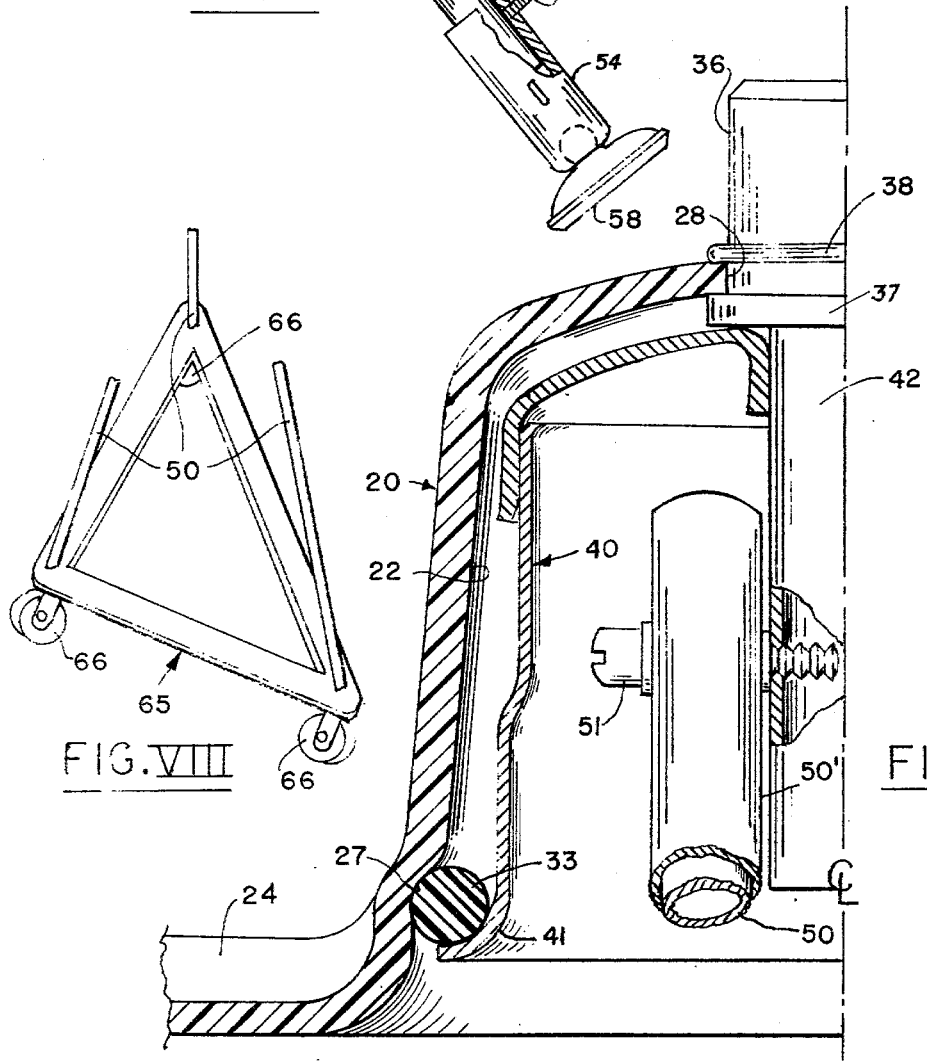
FIG. V

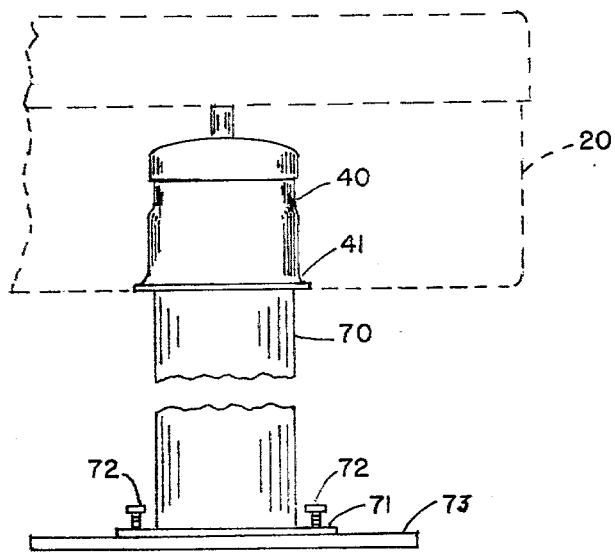
FIG. IX
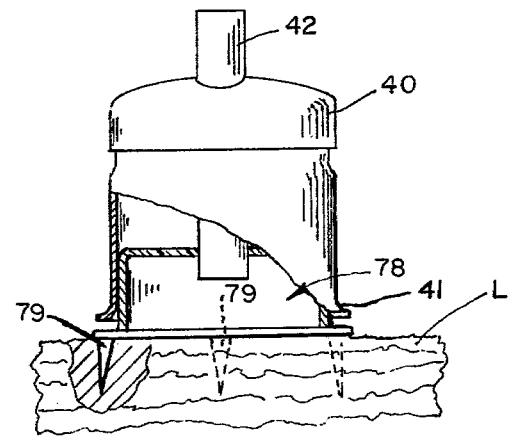
FIG. XII
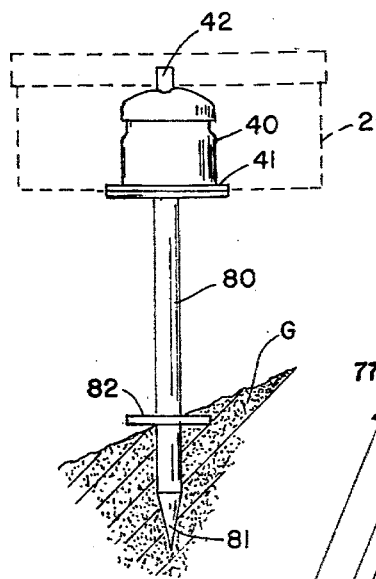
FIG. XI
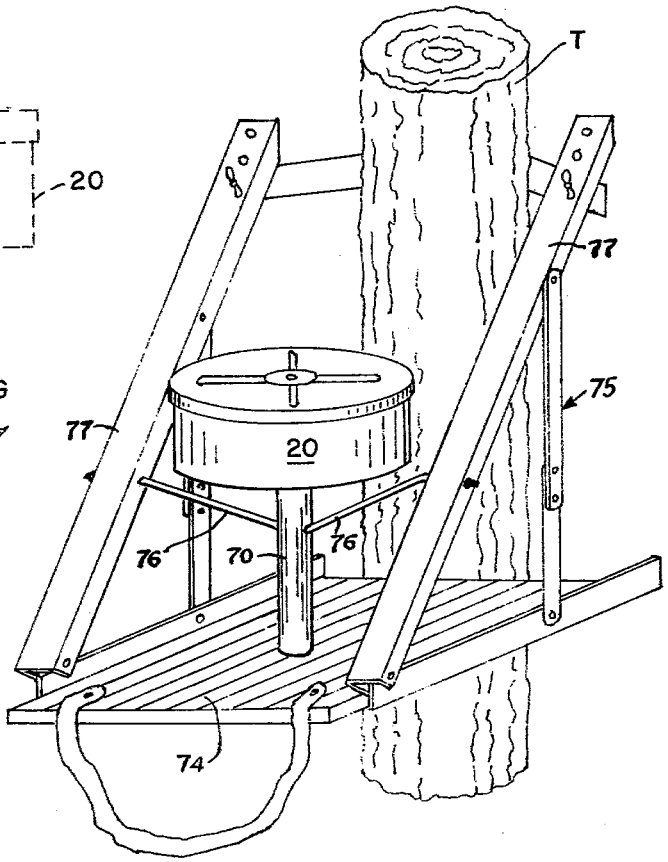
FIG. X

# PORTABLE SWIVEL HUNTER'S STOOL

BACKGROUND OF THE INVENTION

Although portable swivel seats with uni- or tripod collapsible legs are known as shown in the following prior U.S. Pat. Nos.:

| | | |
|---|---|---|
| Powell: | 216,629; | issued June 17, 1879; |
| | Class 248/425; | |
| Birdsall: | 582,338; | issued May 11, 1897; |
| | Class 297/17(X); | |
| Mowrey: | 1,325,164; | issued Dec. 16, 1919; |
| | Class 108/157(X); | |
| Boerma: | 3,283,733; | issued Nov. 8, 1966; |
| | Class 108/159; | |
| Harris: | 3,589,661; | issued June 29, 1971; |
| | Class 297/193(X). | |

No reference was found with the specific two different-size bearing sockets in a seat nor a hollow seat with a removable lid to provide a storage container for articles.

OBJECTS AND ADVANTAGES

Accordingly, it is an object of this invention to provide a simple, efficient, effective, economic, lightweight, strong, stable, portable, collapsible, compact, completely rotatable, silent hunter's stool.

Another object is to provide such a stool which may have different types of leg means, such as pivoted tripod legs, single legs, adjustable legs, different types of feet for the leg means for different kinds of terrain, or for attaching to a board, a log, or a tree platform.

Another object is to provide a hunter's stool having a hollow seat for storage of alternate supporting feet for its leg means, as well as storage for hunter's accessories, such as flashlights, matches, string, whistle, lighter, compass, charcoal, heat cushion, a camouflage cover for the seat, etc.

Still another object is to provide a stool-type support which may be used for a jack for a snowmobile or support for a gun.

Still another object is to provide a portable hunter's or sportsman's stool with a cord means attached to its hollow seat for both holding on a cover for the seat and for holding the collapsed and/or detachable support or leg means for the seat.

SUMMARY OF THE INVENTION

Generally speaking, the completely rotatable portable hunter's stool of this invention comprises a horizontal seat or platform with a lower larger central cylindrical socket with a smaller central hollow tubular portion that extends through the central axis of the seat to form a donut or torus-shaped seat which may be hollow. The central socket at its lower end or beneath the seat is provided with an antifriction bearing, such as an O-ring, with projections thereon for non-rotatable attachment in an offset portion of the socket at its lower and larger open end. The upper open end of this socket is smaller in diameter and contains an antifriction sleeve for providing a smaller upper bearing just below the upper surface of the seat. Into this socket is fitted a hollow bell-shaped plug having attached thereto a central hollow tube which extends outwardly above the bell for journalling in the smaller upper bearing. The outer lower peripheral flange of the bell journals on and in the fixed larger antifriction O-ring bearing seated in the offset at the lower larger open end of the socket in the seat. This provides a stable, quiet and completely relatively rotatable seat with respect to the bell-shaped plug.

The seat may be of a lightweight solid material, such as a plastic foam, or preferably it is hollow and also has an annular lid providing a container for the storage of accessories. The hollow plastic or metal toroidal seat may have reinforcing radial ribs, both in its lid or cover and its base, and may also be provided with partitions, if desired, for fitting different articles that are to be carried therein. One of the advantages of the seat is the manner in which the lid is attached thereto by two diagonally spaced U-shaped cords which extend through vertically aligned apertures in the lid and seat base, and which cords are long enough to permit removal of the lid without removal of the cords from their apertures. These cords preferably are long enough so that the leg means can be held in them together with holding the lid on the container. This holding may be accomplished by means of a slip-lock cord fasteners attached to the free ends of the two parallel cords, such as the one shown in Bengtsson U.S. Pat. No. 3,564,670 issued Feb. 23, 1971. These cords, furthermore, provide easy means for attaching a belt clip and/or a shoulder strap for easy portability of the whole knocked-down stool assembly and all of the articles that the hunter may wish to carry in its container seat.

The tube in the center of the bell-shaped plug extends from above the plug substantially through its center short of its lower flanged edge, and to it or the bell portion may be attached the leg means for the stool. Embodiments of leg means comprise collapsible tripod legs pivoted to the center tube, or a uni-leg which may have a diameter for fitting and attachment around or inside the tube, or of a larger diameter to seat around the inside of the bell of the plug. The lower outer ends of the legs may be provided with feet sections having adjustable telescopic tubular portions for varying the length of one or more of the legs, and/or removable feet with pads or spikes, depending upon the terrain in which the seat is to be used. Furthermore, a triangular-shape dolly or flat plate may be anchored to the lower ends of the uni- or tripod legs, and this plate may be provided with castors, or the plate may be bolted to a board or a platform, as desired. Another form of the leg means may be a single spike with a flange for use on a hill and/or soft ground. If the seat is to be placed on a log, stump, or other pedestal, the leg may be very short and comprise only a plug with antifriction or spike means for fitting into the bell housing.

Since the bell-shape plug has a hollow tubular center which projects into and is openly accessible from the top center of the seat and its lid, a Y-shaped gun rest, which may be carried inside a hollow seat, may be placed in the center of the tube, with or without the seat also on the plug. The leg means may be also used as a support for a snowmobile so that its tracks won't freeze to the ground when it is parked.

BRIEF DESCRIPTION OF THE VIEWS

The above mentioned and other features, objects and advantages, and manners of attaining them are described more specifically below by reference to embodiments of this invention shown in the accompanying drawings, wherein:

FIG. I is a perspective view of the set-up hunter's stool of this invention with collapsible tripod legs and showing above and detached therefrom a gunrest and gun which may be inserted into the center of the leg means for the seat;

FIG. II is a side view of a hunter showing the stool and its leg means collapsed and carried by a shoulder strap;

FIG. III is an enlarged side elevational view of the embodiment shown in FIGS. I and II with the seat and its lid partly in section and removed from the bell-shaped plug and tripod legs, the legs also being shown in dotted lines in their collapsed position;

FIG. IV is an enlarged view of the bell-shaped supporting plug shown in FIG. III with one of the tripod legs, with parts broken away and in section, and another embodiment of a telescopic foot therefor;

FIG. V is a further enlarged sectional view taken along lines V—V of FIG. IV showing the antifriction bearings mounted in the socket portion of the seat;

FIGS. VI and VII are plan and edge views of one embodiment of the O-ring antifriction bearing shown at the lower larger end of the socket in FIG. V;

FIG. VIII is a perspective view of a triangular-shaped base into which the tripod legs of the embodiment shown in FIGS. I and III may be set, which base is provided with castors for mobility of the stool on a smooth floor;

FIG. IX is a side elevational view of an embodiment of a single supporting post-type leg anchored into the bell-shaped plug for supporting the rotatable seat (shown in dotted lines), which leg has a portion broken away and has a plate foot bolted to a board or floor;

FIG. X is a perspective view of the stool of this invention with a leg similar to that shown in FIG. IX anchored to a platform attached to the trunk of a tree;

FIG. XI is a side elevation of another embodiment of a leg means for the stool of this invention (shown in dotted lines), which leg means comprises a spike with a flange for sticking it into soft earth or the side of a hill; and FIG. XII is a side elevation of still another embodiment of a leg means closely fitted into the bell-shaped plug shown in FIG. IV (partly in section) for positioning the rotatable seat on a stump or log.

DETAILED DESCRIPTION OF PREFERRED EMBODIMENTS

The Seat

Referring first to FIGS. I and III, there is shown a tripod leg supported swivel hunter's stool comprising a flat cylindrical or disc-shaped seat 20 having a lower central socket portion 22 into which a bell-shaped plug 40 removably and rotatably seats, and to which plug 40 are attached pivoted tripod legs 50. The seat 20 herein is shown to be hollow and has a removable flanged lid 21, both of which have axially aligned and communicating sockets 22 and 23. These seat parts 20 and 21 may be made of low-coefficient of expansion plastic, such as polyethylene, or of lightweight metal, such as aluminum, and they may be reinforced by radial rib portions 24 and 25, respectively. The lower and deeper part 20 forms a storage container, and may be provided with radial or other shaped partitions 26, as desired. Diametrically spaced in the base container part 20 and its cover or lid 21 are pairs of vertically aligned holes through which are threaded two flexible cords 30, such as of nylon, which are sufficiently long and U-shaped so as to extend about at least twice the thickness or height of the seat 20. The depending free ends of these two cords preferably have knots 31 and slip-wedge type fasteners 32 (of the type shown in above mentioned Bengtsson U.S. Pat. No. 3,564,670) so that the free ends of the cords can be pulled tight and the fasteners can be slid snugly against the bottom of the seat 20 for holding the lid part 21 tightly closing the open top of the container seat part 20. The space inside the container seat 20 is donut or annular in shape in that the inwardly joining socket portions 22 and 23 in the bottom and lid portions provide a continuous aperture through the center of the seat 20 through which a tubular central portion 42 of the bell-shaped plug 40 extends, but not above the top surface of the lid 21.

It is to be understood that although a hollow seat 20 with a removable lid 21 is shown, this may be readily adaptable for a seat which is not hollow or which may be of solid foam plastic and not have a removable lid, provided it has a socket 22 to provide the two spaced and different sized bearings for the swivel bell-shaped plug 40. Also it is to be understood that the whole seat may be covered with a camouflaged covering or of cloth, such as 29 shown in FIG. II, which cover may be carried inside the hollow seat when not used. Also inside the hollow seat there may be provided a cushion or softer pad for putting on the relatively hard plastic cover or top 21, and the pad may even have means for supplying heat.

Referring now to FIGS. V, VI and VII, the lower portion of the bell-shaped socket 22 in the seat part 20 may be offset slightly to form a lower larger diameter rim 27 for seating an antifriction bearing ring 33 (see also FIGS. VI and VII), which O-ring 33 may be provided with radially outwardly extending projecting portions 34 and 35 for anchoring it from rotation in the rim 27. This ring 33 provides a horizontal angular bearing surface which may be of a durable self-lubricating or low-coefficient of friction plastic material, such as nylon, polytetrafluoroethylene, an acetyl copolymer such as Delrin, etc. In the smaller diameter central upper apex opening 28 of the socket 22, there is provided a vertical cylindrical sleeve bearing 36 also made of the same or similar self-lubricating low-coefficient of friction plastic material, which sleeve 36 preferably has a lower radially outwardly extending horizontal flange portion 37 of larger outside diameter than that of hole 28. This flange 37 and a snap O-ring 38 on the opposite side of the aperture 28 from the flange 35 and seated in a circumferential groove in the sleeve 36 holds the sleeve 36 in position. However, this smaller diameter bearing sleeve 36 also may be held in place by means of an adhesive, as may the larger diameter bearing 33.

The lid portion 21 may also be provided with a bearing ring 39 in the aperture at the bottom of its socket portion 23 for journalling on the upper projecting end of the smaller bearing sleeve 36.

Thus, there is provided in the seat portion 20 a pair of axially spaced larger 33 and smaller 36 bearings for stably mounting the seat and permitting its quiet and complete rotation relative to the bell-shaped plug 40 which snap-fits therein.

The Bell Plug and Leg Means

The bell-shaped plug 40 with its integral or brazed central tube 42 that extends above the top of the apex of the bell provides vertical cylindrical and horizontal annular bearing surfaces that journal in the bearing 36, may be made of metal or plastic and may be made of three separate parts which are brazed or welded together, such as those shown for the bell 40 in FIGS. III, IV and V. The lower end of the bell 40 is provided with an outwardly extending flange portion or rim 41, which together with the cylindrical surface of the lower portion of the bell 40 acts as a horizontal angular bearing surface for the larger O-ring bearing 33.

The leg means are attached to inside the bell plug 40 and for the tripod legs 50 shown in FIGS. I through V, these legs 50 are shown pivoted by radially inwardly extending screws 51 on the lower portion of the tube 42 inside the bell plug 40. Thus, the legs 50 may be collapsed around their horizontally equally angularly spaced pivoted axes into the position shown in FIG. II and in dotted lines in FIG. III so that the leg means can be held inside the loops formed by the cables 30 and fastening means 32 and against the bottom of the seat 20 so that the stool may be easily carried as a unit when in its knocked-down condition. These cords 30 may also be provided with a belt-type clip 60 for hanging the assembly on the belt of a hunter, or the cords 30 may be used to attach a separate shoulder strap 62 as shown on the hunter H in FIG. II. These carrying means 60 and 62 may be stored in the hollow seat 20 when not in use.

Furthermore, the upper pivoted ends of the tripod legs 50 may be reinforced by an inner or outer reinforcing tube section 50', if desired, or the whole leg may be made of a stronger or thicker walled tube. The tripod legs may be restricted in their outward movement both by the contact of their upper ends inside the bell plug 40 (see FIG. IV) and by a chain or cable 52 which may be attached to separate rings or wire loops 53 on each of the legs above their outer free ends.

The outer free ends of the legs 50 preferably are provided with feet 55 which may comprise socket portions that removably fit over the free ends of the tubular legs 50 and have flanged or angular flat pad portions 50 as shown in FIG. I or spiked pad portions 57 as shown in FIG. III, depending upon the type of terrain the legs are to be placed. Interchangeable feet for the legs may be carried in the hollow seat 20. In FIG. IV there is shown a different type foot 54 having a ball socket connecting floating pad 58 and an elongated tubular socket section which may be held in place by a thumbscrew 59 for adjusting the length of the leg 50. Instead of providing different types of feet or pads such as 56, 57 and 58, the free ends of the tripod legs 50 may be socketed into a triangular frame 65 as shown in FIG. VIII which frame may have mounted at its corners castors 66 so that the stool can be used on and readily moved over a smooth flat floor surface, and thus have a use other than for rough terrain as found when hunting.

Instead of tripod legs 50, other type legs may be attached to the bellshaped plug 40 as shown in FIGS. IX through XII, respectively. In FIGS. IX and X, there is shown attached inside the bell plug 40 a post-type unit leg 70 which has mounted on its lower end a radially outwardly extending flange or plate 71 which may be provided with bolts or screws 72 for mounting it on a flat board 73 or a platform 74 of a portable tree stand 75 as shown in FIG. X, which portable stands 75 are often used by hunters and attached to the trunk T of a tree.

Instead of bolting the unit leg 70 to the platform 74, the plate 71 may be removed and the leg 70 may be steadied by side arms 76 pivoted through the unit leg 70 and at their ends to the parallel side braces 77 of the stand 75. Thus, the stool's support is collapsible with the platform 75 for portability, or movable back toward the tree trunk T allowing more space on the platform 74 for standing.

Furthermore, if desired, the leg means for the seat 20 may be very short leg means 78 as shown in FIG. XII and may be provided with lower extending tines or spikes 79 for holding it onto a top of a tree stump or a fallen tree or log L.

Still further, it should be understood that it is not essential that the single or uni- leg means be of a diameter for attachment to the inside of the bell 40, but may be of a smaller diameter as the leg 80 shown in FIG. XI which may be fixed to the tubular portion 42 inside the bell 40 and be provided with a pointed free lower end 81 and flanged portion 82 upwardly therefrom, so the seat 20 can be used on soft and/or sloping ground G.

The leg means and bell-shaped plug 40 may be used as a support, such as for a gun sight 90 as shown in FIG. I, which may comprise a Y-shaped yoke with a central soft pad 91 for the gun G between the legs of the yoke, and the stem 92 thereof may be provided with a lower pin-type end 93 that seats inside the open upper end of the tube 42. Since this tube 42 extends through the seat 20 and its lid 21, the mount 90 for the gun G may be used with or without the seat 20 in place, as desired.

While there is described above the principles of this invention in connection with specific apparati, it is to be clearly understood that this description is made only by way of example and not as a limitation to the scope of this invention.

We claim:

1. A horizontally swivable support comprising:
   (A) a horizontally rotatable platform means having:
      (1) a central bell-shaped socket having an apex and a rim; and
      (2) separate smaller and larger diameter concentric axially spaced inside circular bearings attached inside said apex and said rim of said socket, respectively, said smaller bearing providing both vertical and horizontal bearing surfaces and said larger bearing providing a horizontal angular bearing surface; and
   (B) pedestal means having:
      (1) a bell-shaped plug having an apex and a rim removably seatable inside said socket and having separate outside vertically cylindrical and horizontal bearing surfaces at said plug apex and a horizontal angular bearing surface at said plug rim, respectively, for contacting said bearings, and
      (2) leg means attached to inside of and projecting below said bell-shaped plug for supporting said platform so that it is completely rotatable with respect to said pedestal means.

2. A support according to claim 1 wherein said platform is made of a low coefficient expansion plastic.

3. A support according to claim 1 wherein said bearings comprise self-lubricating low coefficient of friction plastic annuli.

4. A support according to claim 1 wherein said plug has an axial tube projecting therefrom journalled in said smaller diameter vertical cylindrical bearing surface, and providing a hole through said platform.

5. A support according to claim 4 including a Y-shaped yoke seatable in said tube forming said hole in said platform.

6. A support according to claim 1 wherein said leg means comprises three equally angularly spaced legs pivotly anchored to said plug means.

7. A support according to claim 1 wherein said leg means comprises a tubular post seated at its upper end in said plug means.

8. A support according to claim 1 wherein said leg means is provided with a telescopically adjustable portion at its outer end.

9. A support according to claim 1 wherein said leg means comprises a spike with a flange spaced upwardly from its pointed end.

10. A support according to claim 1 wherein the outer end of said leg means has a plate-type pad.

11. A support according to claim 10 wherein said pad is provided with spikes.

12. A portable swivel hunter's stool comprising:
(A) a hollow torus seat comprising:
  (1) an annular trough portion having a central bell-shaped socket,
  (2) a removable annular cover for said trough portion,
  (3) two separate axially and radially spaced antifriction bearing means in said socket, and
  (4) flexible cord means for anchoring said cover to said trough portion; and
(B) removable support means for said seat comprising:
  (1) a hollow bell-shaped plug means having two separate axially and radially spaced bearing surfaces for engaging said bearing means of said socket permitting complete rotatability of said seat means,
  (2) leg means attached to the inside of said plug means, and
  (3) feet means attached to the outer end of said leg means.

13. A stool according to claim 12 wherein said trough portion includes partitions.

14. A stool according to claim 12 wherein said trough portion contains reinforcing ribs.

15. A stool according to claim 12 wherein said seat is made of a low coefficient expansion plastic.

16. A stool according to claim 12 wherein said antifriction bearing means comprises a self-lubricating plastic.

17. A stool according to claim 12 wherein said antifriction means are anchored in said socket.

18. A stool according to claim 12 wherein said cord means extends through apertures in said trough portion and said cover portion and is provided with a slip-lock fastener outside of said seat.

19. A stool according to claim 12 wherein said cover has a central aperture and wherein one of said antifriction bearing means has a hollow cylindrical projection for seating said central aperture in said cover.

20. A stool according to claim 19 wherein one of said bearing surfaces of said plug means has a central tubular portion projecting axially upwardly from the center thereof seating in said upper hollow cylindrical projection of said one bearing means of said socket.

21. A stool according to claim 20 wherein the other bearing surface of said plug means comprises a radially outwardly extending flange for engaging the other of said bearing means in said socket.

22. A stool according to claim 12 wherein said leg means comprises three equally angularly spaced legs pivotally anchored in said plug means.

23. A stool according to claim 22 wherein said pivoted legs includes means for limiting their outward angular movements about their pivots.

24. A stool according to claim 22 wherein the outer free ends of said leg means have replaceable feet.

25. A stool according to claim 24 wherein said feet are provided with spikes.

26. A stool according to claim 24 wherein said feet are provided with pivoted plates.

27. A stool according to claim 12 wherein said leg means comprises an axial tubular post seated at its upper end in said plug means.

28. A stool according to claim 12 wherein said leg means is provided with a telescopically adjustable lower portion at its outer end.

29. A stool according to claim 12 wherein said leg means comprises a spike with a flange near its pointed end.

30. A stool according to claim 12 wherein said leg means has a plate-type pad at its outer end.

31. A stool according to claim 30 wherein said leg means pad is mounted on a tree platform.

32. A stool according to claim 12 wherein said leg means are attached to a castered frame.

33. A stool according to claim 12 wherein said seat means includes a removable flexible camouflage cover storable inside said hollow torus portion.

34. A stool according to claim 12 wherein said cord means also anchors said removable support means to said seat means for portability.

35. A stool according to claim 12 including a belt clip attached to said cord means.

36. A stool according to claim 12 including a shoulder strap attached to said cord means.

37. A stool according to claim 12 including a Y-shaped yoke means seatable in the central aperture of said seat means.

38. A stool according to claim 12 wherein said support means is pivotally attached to a tree stand.

* * * * *

UNITED STATES PATENT AND TRADEMARK OFFICE
CERTIFICATE OF CORRECTION

PATENT NO. : 4,266,748
DATED : May 12, 1981
INVENTOR(S) : Thomas P. Dalton

It is certified that error appears in the above-identified patent and that said Letters Patent is hereby corrected as shown below:

Column 5, line 37, "50" (second occurrence) should read -- 56 --.

Signed and Sealed this

Twenty-third Day of November 1982

[SEAL]

Attest:

Attesting Officer

GERALD J. MOSSINGHOFF
Commissioner of Patents and Trademarks